Jan. 15, 1929.  1,699,414

M. WEINSTEIN

OUTLET BOX AND SUPPORT

Filed Nov. 25, 1927

Morris Weinstein, INVENTOR:

BY Everett Rook, ATTORNEYS.

Patented Jan. 15, 1929.

1,699,414

UNITED STATES PATENT OFFICE.

MORRIS WEINSTEIN, OF PASSAIC, NEW JERSEY.

OUTLET BOX AND SUPPORT.

Application filed November 25, 1927. Serial No. 235,499.

This invention relates to electrical outlet boxes, and more especially such outlet boxes as are used for ceilings and provided with means for supporting them upon the overhead floor joists or the like.

The objects of the invention are to secure improved supporting means, and supporting means which shall hold the outlet box in firm and stable position without any possibility of it turning or twisting; to secure a simple and effective construction, and to obtain other advantages and results as may be brought out by the following description.

Referring to the accompanying drawings, in which like numerals of reference indicate the same parts throughout the several views, Figure 1 is a vertical longitudnial section of an outlet box and support of my improved construction;

Figure 1:
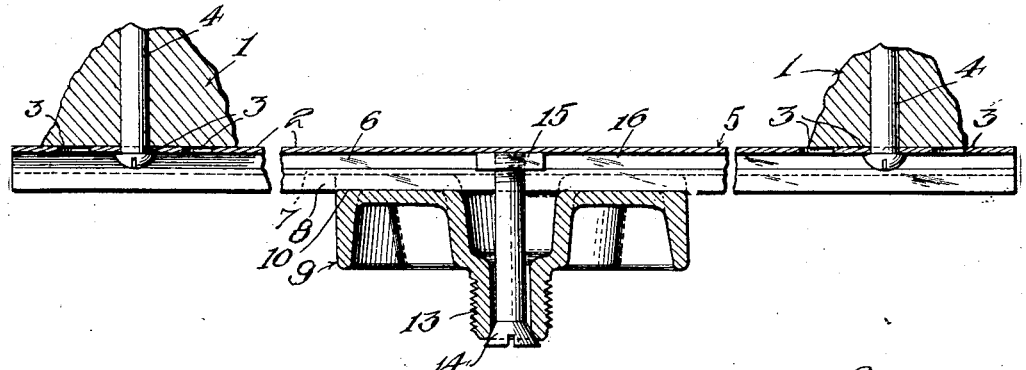
Figure 3:
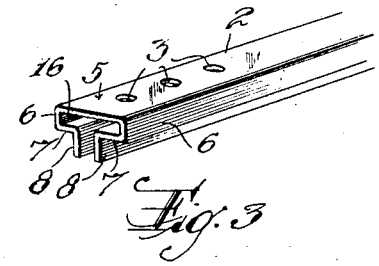
Figure 3 is a perspective view of one end of the supporting bar.
Figure 2:
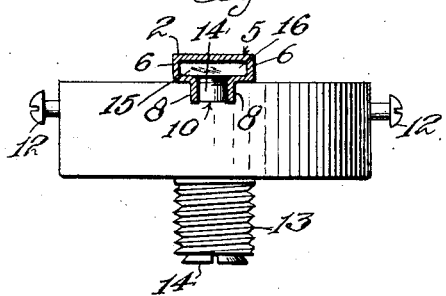
Figure 2 is an end elevation of the same.
Figure 4:
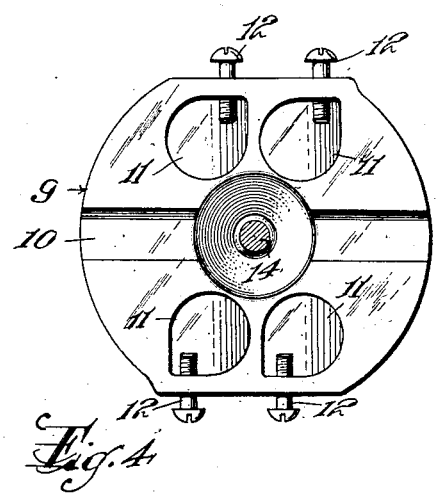
Figure 4 is a plan of the outlet box, looking at its base which lies against the supporting bar.

In said drawings 1, 1 indicates spaced floor joists above a room to the ceiling of which it is desired to apply my improved outlet box, and 2 indicates a supporting bar having at each end a series of holes 3 through which nails 4 or the like may be driven into the said floor joists to position the supporting bar 2 transversely thereof as shown. Said supporting bar is of sheet metal rolled or otherwise formed into a T-shaped cross-section forming a hollow interior of that same shape. The base wall 5 of the strip which lies against the floor joists is closed and flat, the metal being bent at the edges of said wall 5 at right angles thereto to form side walls 6, 6 of any desired height and being at the edges of said side walls 6, 6 bent inward to form walls 7, 7 extending toward each other parallel to the wall 5. The adjacent edges of said walls 7, 7 are spaced the desired distance and the metal at said edges are bent outwardly to form similarly spaced flanges 8, 8 parallel to each other and at right angles to the walls 5 and 7.

The outlet box is designated by the reference numeral 9, and may be of any common and well-known type which can be provided transversely of its base with a groove 10 to receive the parallel flanges 8, 8 of the supporting bar 1, so that the walls 7, 7 preferably lie flat against the bottom of the outlet box. I have shown said outlet box as substantially circular and of cast iron with openings 11 for the proper insulated wires to lead through, each having the usual set screw 12 for clamping said wires. The outlet box also has the usual central hollow exteriorly threaded stud 13, and it is by means of this stud that I preferably secure the outlet box to the supporting bar 1 so that it can be adjusted longitudinally thereof and clamped in any desired position. To accomplish this, a bolt, such as a stove bolt 14, extends through the hollow stud 13 and into a nut 15 slidably fitted within the groove 16 of the supporting bar, the said bolt 13 passing between the flanges 8, 8 of the bar.

It will thus be seen that the outlet box 9 can be slid longitudinally of the supporting bar 2 into desired position thereon, and clamped rigidly in such position by tightening the bolt 14 to clamp box and bar tightly together.

Various detail modifications may be made in manufacturing my invention, by those skilled in the art, without departing from the spirit and scope of the invention, and therefore I do not wish to be understood as limiting myself except as required by the following claims when construed in the light of the prior art.

Having thus described the invention, what I claim is:

1. The combination of a hollow bar having a longitudinal slot communicating with the hollow interior of the bar and a raised flange on the bar adjacent each edge of the slot, with a box having a groove across one wall thereof and disposed with the flanges of the bar in the groove, a bolt having one end disposed in the hollow interior of the bar and projecting through the slot into the box, and means on the bolt for clamping the box against the bar.

2. The combination of a hollow bar having a longitudinal slot communicating with the hollow interior of the bar and a raised flange on the bar adjacent each edge of the slot, with a box having a groove across one wall thereof and disposed with the flanges of the bar in the groove, a bolt having one end disposed in the hollow interior of the bar and projecting through the slot into the box, and an element slidably and non-rotatably mounted in the hollow interior of the bar and coacting with the bolt for clamping the box against the bar.

MORRIS WEINSTEIN.